United States Patent
Park

(10) Patent No.: US 12,240,452 B2
(45) Date of Patent: Mar. 4, 2025

(54) DRIVING CONTROL APPARATUS AND METHOD FOR VEHICLE

(71) Applicants: Hyundai Motor Company, Seoul (KR); Kia Corporation, Seoul (KR)

(72) Inventor: Gi Won Park, Incheon (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 336 days.

(21) Appl. No.: 17/876,002

(22) Filed: Jul. 28, 2022

(65) Prior Publication Data
US 2023/0150495 A1   May 18, 2023

(30) Foreign Application Priority Data
Nov. 16, 2021   (KR) .................. 10-2021-0157882

(51) Int. Cl.
*B60W 30/12* (2020.01)
*G06V 20/56* (2022.01)

(52) U.S. Cl.
CPC .......... *B60W 30/12* (2013.01); *G06V 20/588* (2022.01); *B60W 2420/403* (2013.01); *B60W 2552/53* (2020.02)

(58) Field of Classification Search
None
See application file for complete search history.

(56) References Cited

U.S. PATENT DOCUMENTS

| | | | | |
|---|---|---|---|---|
| 7,346,190 B2* | 3/2008 | Taniguchi | ............ | G06V 20/588 |
| | | | | 382/104 |
| 8,363,896 B2* | 1/2013 | Tamura | ................ | G06V 20/588 |
| | | | | 382/104 |
| 8,812,193 B2* | 8/2014 | Luke | ...................... | B60W 30/12 |
| | | | | 701/41 |
| 8,847,792 B2* | 9/2014 | Tsunekawa | ............. | G01S 13/72 |
| | | | | 340/904 |
| 9,317,755 B2* | 4/2016 | Kataoka | ............... | G06V 10/421 |
| 9,317,756 B2* | 4/2016 | Takemae | ............... | G06V 20/588 |
| 9,626,573 B2* | 4/2017 | Maeda | ................. | G06V 20/588 |
| 9,842,265 B2* | 12/2017 | Kataoka | ............... | G06V 20/588 |
| 9,846,823 B2* | 12/2017 | Kato | ...................... | G08G 1/167 |
| 9,911,049 B2* | 3/2018 | Suzuki | ................. | G06V 20/588 |
| 10,053,092 B2* | 8/2018 | Sakamoto | ............. | B60W 10/04 |
| 11,440,539 B2* | 9/2022 | Ohmura | ................ | B60W 40/04 |
| 11,491,975 B2* | 11/2022 | Ohmura | ............ | B60W 30/0953 |
| 11,741,726 B2* | 8/2023 | Li | ..................... | G06F 18/24137 |
| | | | | 382/100 |

(Continued)

FOREIGN PATENT DOCUMENTS

| CN | 112818792 A | * | 5/2021 | ............ | G06F 18/23 |
|---|---|---|---|---|---|
| CN | 113077528 A | * | 7/2021 | | |

(Continued)

*Primary Examiner* — Kevin R Steckbauer
(74) *Attorney, Agent, or Firm* — Fox Rothschild LLP

(57) ABSTRACT

Disclosed are an apparatus and method for controlling driving of a vehicle. The apparatus for controlling driving of the vehicle includes a controller that recognizes a double traffic line on a road on which the vehicle travels, generates a virtual center line between an inside line and an outside line of the double traffic line, and controls driving of the vehicle based on the virtual center line, and an output device that outputs the virtual center line.

11 Claims, 19 Drawing Sheets

(56) References Cited

U.S. PATENT DOCUMENTS

| | | | | |
|---|---|---|---|---|
| 2005/0196019 A1* | 9/2005 | Taniguchi | | G06V 20/588 |
| | | | | 382/104 |
| 2007/0084655 A1* | 4/2007 | Kakinami | | G06V 10/255 |
| | | | | 180/167 |
| 2009/0157286 A1* | 6/2009 | Saito | | B60W 30/12 |
| | | | | 701/300 |
| 2011/0052079 A1* | 3/2011 | Tamura | | G06V 20/588 |
| | | | | 382/199 |
| 2012/0327233 A1* | 12/2012 | Imai | | B60W 40/10 |
| | | | | 701/1 |
| 2013/0169449 A1* | 7/2013 | Tsunekawa | | G08G 1/166 |
| | | | | 340/933 |
| 2015/0262020 A1* | 9/2015 | Kataoka | | G06V 20/588 |
| | | | | 382/104 |
| 2015/0317526 A1* | 11/2015 | Muramatsu | | G06V 20/588 |
| | | | | 348/148 |
| 2015/0363668 A1* | 12/2015 | Kato | | G08G 1/167 |
| | | | | 382/104 |
| 2016/0026879 A1* | 1/2016 | Maeda | | G06V 20/588 |
| | | | | 382/104 |
| 2018/0165954 A1* | 6/2018 | Song | | G08G 1/056 |
| 2019/0163991 A1 | 5/2019 | Tian et al. | | |
| 2019/0251373 A1* | 8/2019 | Lee | | G08G 1/167 |
| 2020/0331466 A1* | 10/2020 | Ohmura | | B60W 30/18154 |
| 2020/0331468 A1* | 10/2020 | Ohmura | | B60W 40/04 |
| 2022/0027639 A1* | 1/2022 | Li | | G06V 10/22 |
| 2023/0150495 A1* | 5/2023 | Park | | B60W 60/001 |
| | | | | 701/41 |
| 2023/0252677 A1* | 8/2023 | Cao | | G06T 7/73 |
| | | | | 382/104 |
| 2023/0303115 A1* | 9/2023 | Tominaga | | G08G 1/16 |

FOREIGN PATENT DOCUMENTS

| | | | | |
|---|---|---|---|---|
| CN | 113968229 A | * | 1/2022 | B60W 40/06 |
| CN | 117255756 A | * | 12/2023 | B60W 40/06 |
| DE | 102011053002 A1 | * | 3/2012 | G06K 9/00798 |
| DE | 102020105676 A1 | * | 9/2021 | |
| DE | 102011053002 B4 | * | 10/2023 | G06K 9/00798 |
| EP | 3955218 A2 | * | 2/2022 | G06F 18/23 |
| JP | 2016004287 A | * | 1/2016 | G06K 9/00798 |
| WO | 2021-037350 A1 | | 3/2021 | |

\* cited by examiner

DRIVING CONTROL APPARATUS AND METHOD FOR VEHICLE

CROSS-REFERENCE TO RELATED APPLICATION

This application is based on and claims the benefit of Korean Patent Application No. 10-2021-0157882, filed in the Korean Intellectual Property Office on Nov. 16, 2021, the entire contents of which are incorporated herein by reference.

TECHNICAL FIELD

Embodiments of the present disclosure relate to a technology capable of recognizing a double traffic line on a driving road and controlling driving of a vehicle based thereon.

DESCRIPTION OF RELATED ART

In general, an autonomous vehicle recognizes a road environment by itself, determines a driving situation, and controls various systems in the vehicle, including a steering device, to move from a current position to a target position along a planned driving route.

Such the autonomous vehicle may include an Autonomous Emergency Braking (AEB), a Forward Collision Warning System (FCW), an Adaptive Cruise Control (ACC), and a line Departure Warning System (LDWS), a line Keeping Assist System (LKAS), a Blind Spot Detection (BSD), Rear-end Collision Warning System (RCW), a Smart Parking Assist System (SPAS), and the like.

In particular, the autonomous vehicle is designed to recognize a line on the driving road and to drive in a center of a lane formed by the recognized line. In this autonomous vehicle, when the recognized line is a double traffic line, since the vehicle travels in the center of the lane formed by an inside line or an outside line, the vehicle does not actually travel in the center of the lane.

This may act as a factor impairing the driving stability of the autonomous vehicle, and a solution is required.

Descriptions in this background section are provided to enhance understanding of the background of the disclosure and may include descriptions other than those of the prior art already known to those of ordinary skill in the art to which this technology belongs.

SUMMARY

An embodiment of the present disclosure provides a driving control apparatus and method for a vehicle capable of improving a driving stability of the vehicle, by detecting a double traffic line on a driving road based on a top-view image, generating a virtual center line between an inside line and an outside line of the double traffic line, and controlling driving of the vehicle based on the virtual center line.

According to an embodiment of the present disclosure, a driving control apparatus for a vehicle includes a controller that is configured to recognize a double traffic line on a road on which the vehicle travels, generate a virtual center line between an inside line and an outside line of the double traffic line, and control driving of the vehicle based on the virtual center line, and an output device that outputs the virtual center line.

According to an exemplary embodiment, the controller may include recognizing that the inside line and the outside line are the double traffic line when an angle between the inside line and the outside line does not exceed a reference angle, and a distance between the inside line and the outside line does not exceed a reference distance.

According to an exemplary embodiment, the reference angle may be set to an angle for filtering a zebra line.

According to an exemplary embodiment, the controller may be configured to recognize any one of a double traffic line in which both the inside line and the outside line are solid lines, a double traffic line in which the inside line is a solid line and the outside line is a dotted line, a double traffic line in which the inside line is a dotted line and the outside line is a solid line, and a double traffic line in which both the inside line and the outside line are dotted lines.

According to an exemplary embodiment, the controller may be configured to represent the inside line as a quadratic function 'A', represents the outside line as a quadratic function 'B', obtains an average value of coefficients of each of the quadratic functions 'A' and 'B', and may generate the virtual center line based on the average value.

According to an exemplary embodiment, the controller may be configured to count an effective number of times that an intermediate value between a value y1 on the quadratic function 'A' for an 'x' value and a value y2 on the quadratic function 'B' for the 'x' value is located on a quadratic function representing the virtual center line and may calculate a ratio of the effective number of times to a total number of times as a reliability of the virtual center line.

According to an exemplary embodiment, the controller may be configured to calculate a reliability of the virtual center line based on a degree to which the virtual center line is located at a center between the inside line and the outside line.

According to an embodiment of the present disclosure, a driving control method for a vehicle includes recognizing, by a controller, a double traffic line on a road on which the vehicle travels, generating, by the controller, a virtual center line between an inside line and an outside line of the double traffic line, and controlling, by the controller, driving of the vehicle based on the virtual center line.

According to an exemplary embodiment, the recognizing of the double traffic line on the road may include recognizing that the inside line and the outside line are the double traffic line when an angle between the inside line and the outside line does not exceed a reference angle, and a distance between the inside line and the outside line does not exceed a reference distance.

According to an exemplary embodiment, the double traffic line may include any one of a double traffic line in which both the inside line and the outside line are solid lines, a double traffic line in which the inside line is a solid line and the outside line is a dotted line, a double traffic line in which the inside line is a dotted line and the outside line is a solid line, and a double traffic line in which both the inside line and the outside line are dotted lines.

According to an exemplary embodiment, the generating of the virtual center line may include representing the inside line as a quadratic function 'A', representing the outside line as a quadratic function 'B', obtaining an average value of coefficients of each of the quadratic functions 'A' and 'B', and generating the virtual center line based on the average value.

According to an exemplary embodiment, the driving control method for the vehicle may further include calculating a reliability of the virtual center line based on a degree to which the virtual center line is located at a center between the inside line and the outside line.

According to an exemplary embodiment, the calculating of the reliability of the virtual center line may include counting an effective number of times that an intermediate value between a value y1 on the quadratic function 'A' for an 'x' value and a value y2 on the quadratic function 'B' for the 'x' value is located on a quadratic function representing the virtual center line and calculating a ratio of the effective number of times to a total number of times as a reliability of the virtual center line.

As discussed, the method and system suitably include use of a controller or processer.

In another aspect, vehicles are provided that comprise an apparatus as disclosed herein.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
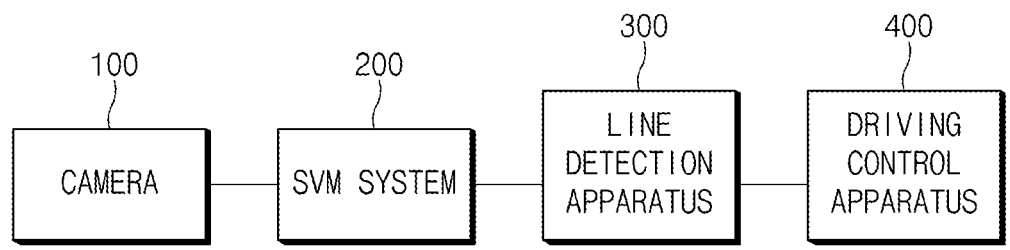
FIG. 1 is a diagram illustrating an image-based line detection system used in an exemplary embodiment of the present disclosure.

Hereinafter, some embodiments of the present disclosure will be described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a." "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In describing the components of the embodiment according to embodiments the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating an image-based line detection system used in an exemplary embodiment of the present disclosure.

As illustrated in FIG. 1, an image-based line detection system used in an exemplary embodiment of the present disclosure may include a camera 100, a surround view monitoring (SVM) system 200, a line detection apparatus 300, and a driving control apparatus 400. In this case, the line detection apparatus 300 may be integrated into the driving control apparatus 400 and may be implemented such that the driving control apparatus 400 performs a function of the line detection apparatus 300.

Referring to each of the components, first, the camera 100 may be an image capturing device that captures images around the vehicle, and may include a front camera, a rear camera, a left camera, and a right camera. These cameras are tuned to generate an optimal surround view (SV) image (e.g., a top-view image).

Figure 2A:
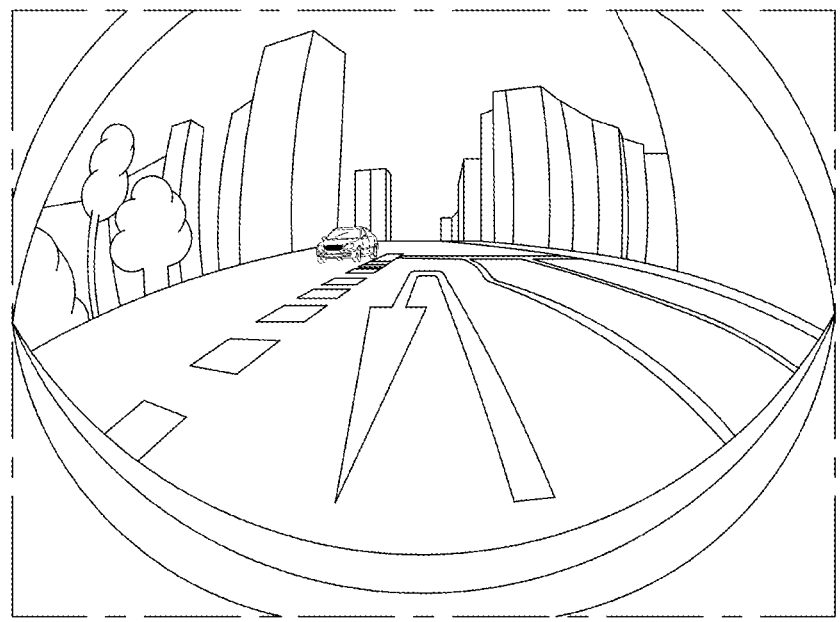
FIG. 2A is a diagram illustrating an image captured by a front camera provided in an image-based line detection system used in an exemplary embodiment of the present disclosure.
Figure 2B:
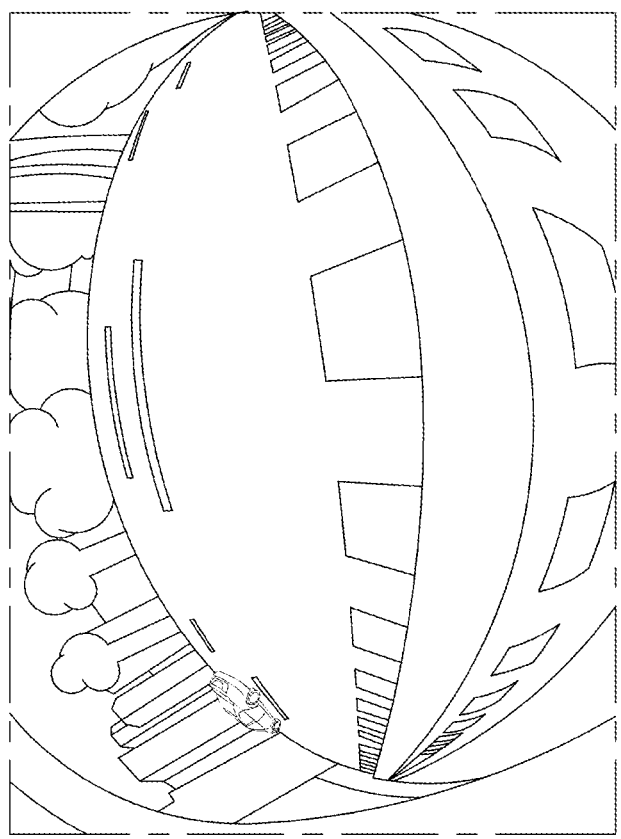
FIG. 2B is a diagram illustrating an image captured by a left camera provided in an image-based line detection system used in an exemplary embodiment of the present disclosure.

The front camera may be located at the front of the vehicle and may be used to acquire a front image of the vehicle. In particular, the front camera may be located in a central portion between both headlamps of the vehicle but is not limited thereto. An image captured by such a front camera is illustrated in FIG. 2A as an example.

The rear camera is located at the rear of the vehicle and may be used to acquire a rear image of the vehicle. In particular, the rear camera may be located in a central portion between both rear lamps of the vehicle but is not limited thereto.

The left camera is located on the left side of the vehicle and may be used to acquire the left image of the vehicle. In particular, the left camera may be located at the lower end of the left side mirror of the vehicle but is not limited thereto. An image captured by such a left camera is illustrated in FIG. 2A as an example.

Figure 2C:
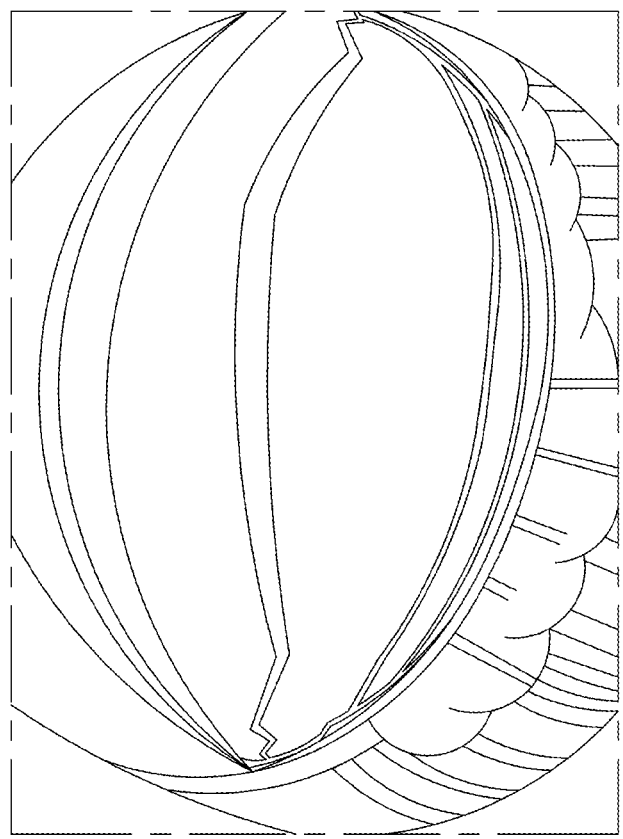
FIG. 2C is a diagram illustrating an image captured by a right camera provided in an image-based line detection system used in an exemplary embodiment of the present disclosure.

The right camera is located on the right side of the vehicle and may be used to acquire a right image of the vehicle. In particular, the right camera may be located at the lower end of the right side mirror of the vehicle but is not limited thereto. An image captured by such a right camera is illustrated in FIG. 2C as an example.

Figure 3A:
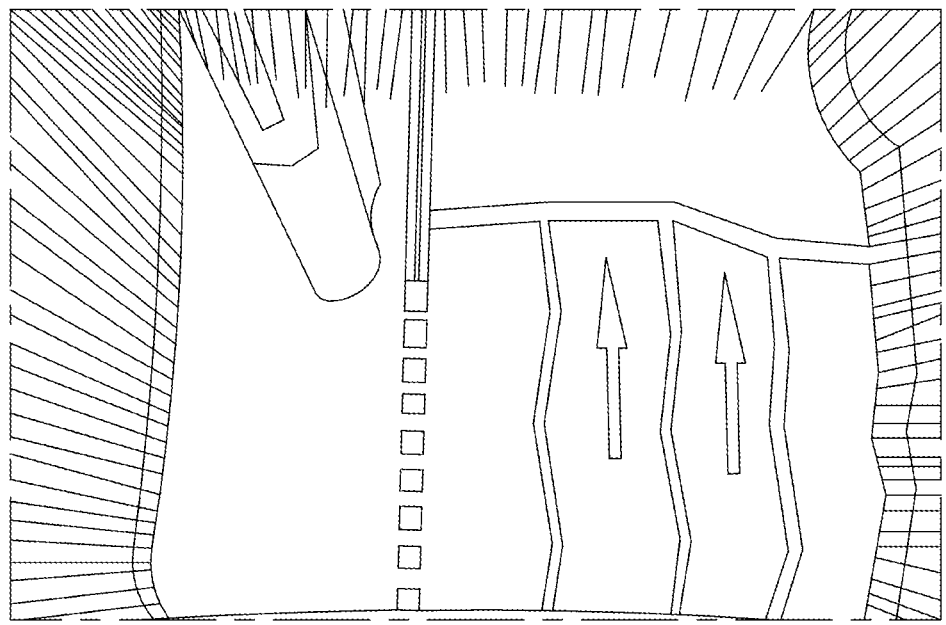
FIG. 3A is a diagram illustrating a top-view image generated by an SVM system provided in an image-based line detection system used in an exemplary embodiment of the present disclosure.
Figure 3B:
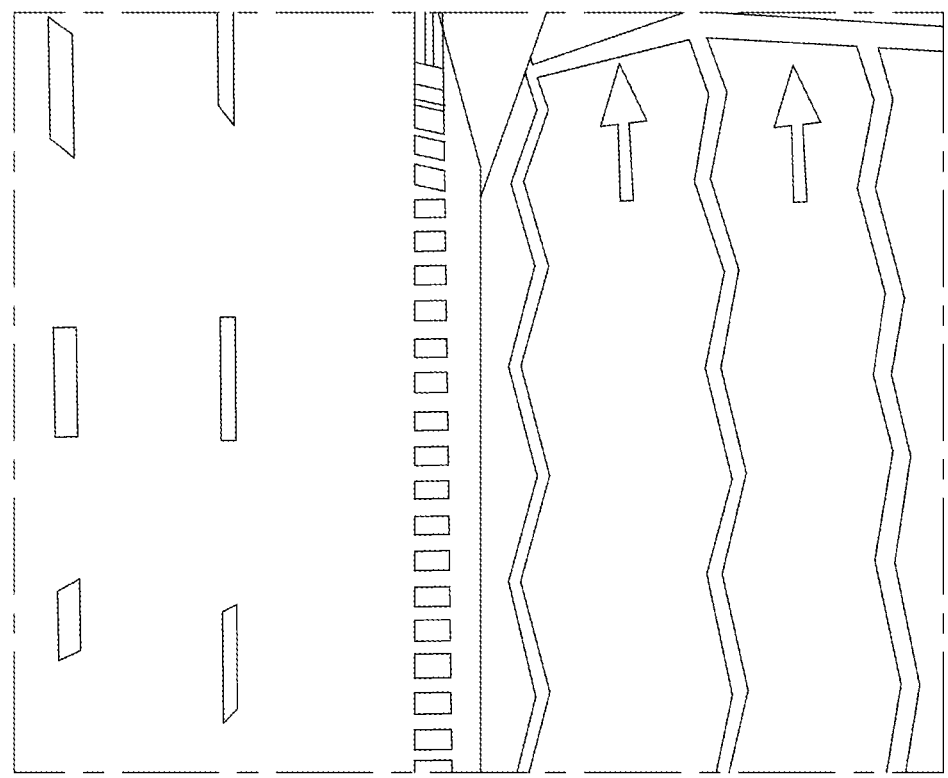
FIG. 3B is another diagram illustrating a top-view image generated by an SVM system provided in an image-based line detection system used in an exemplary embodiment of the present disclosure.

The SVM system 200 may convert an image captured by the camera 100 into a top-view image. The top-view image generated by the SVM system 200 is as illustrated in FIGS. 3A and 3B. FIG. 3A illustrates a result of converting a front image captured by the front camera into a top-view image, and FIG. 3B illustrates a top-view image generated using a left image captured by the left camera and a right image captured by the right camera.

The line detection apparatus 300 may detect a line for each frame based on the top-view image generated by the SVM system 200. Hereinafter, an operation of the line detection apparatus 300 will be described in detail.

Figure 4A:
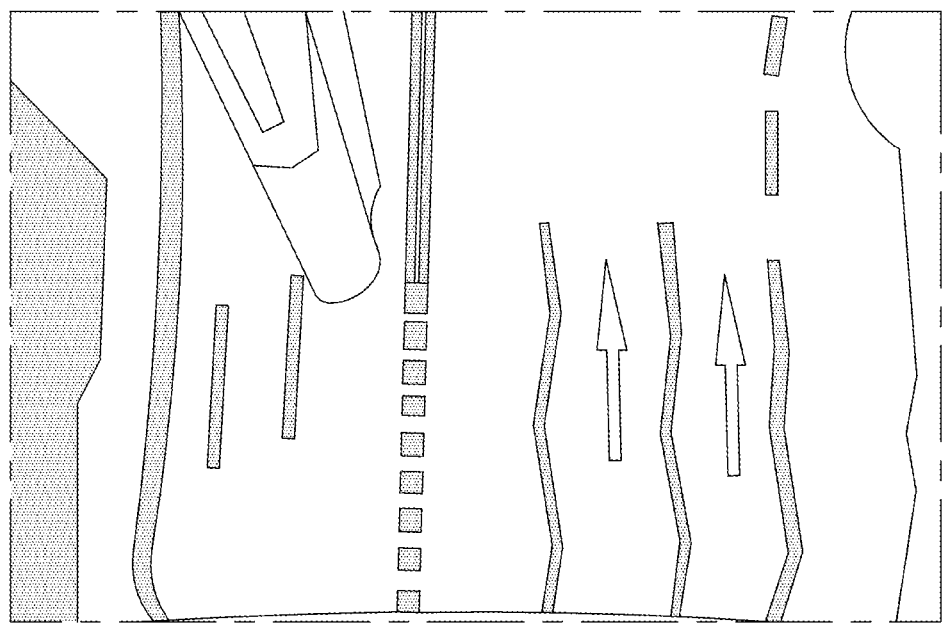
FIG. 4A is a diagram illustrating a result of classifying an object in a top-view image by a line detection apparatus provided in an image-based line detection system used in an exemplary embodiment of the present disclosure.
Figure 4B:
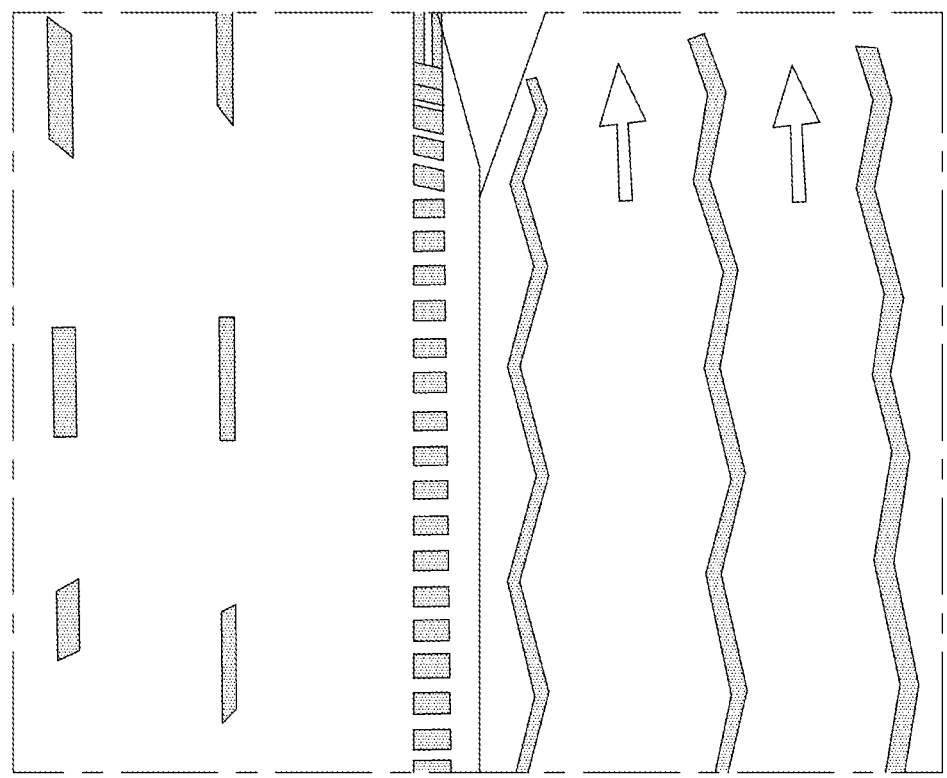
FIG. 4B is another diagram illustrating a result of classifying an object in a top-view image by a line detection apparatus provided in an image-based line detection system used in an exemplary embodiment of the present disclosure.

First, the line detection apparatus 300 may include a line detection model on which deep learning has been completed and may classify objects from the top-view image generated by the SVM system 200 based on the line detection model. That is, the line detection apparatus 300 may detect class information of each pixel for each frame of the top-view image. The class information of each pixel detected in this way is illustrated in FIGS. 4A and 4B. FIG. 4A illustrates a result of detecting class information of each pixel in the front top-view image of the vehicle, and FIG. 4B illustrates a result of detecting the class information of each pixel in the left and right top-view images of the vehicle.

Figure 5A:
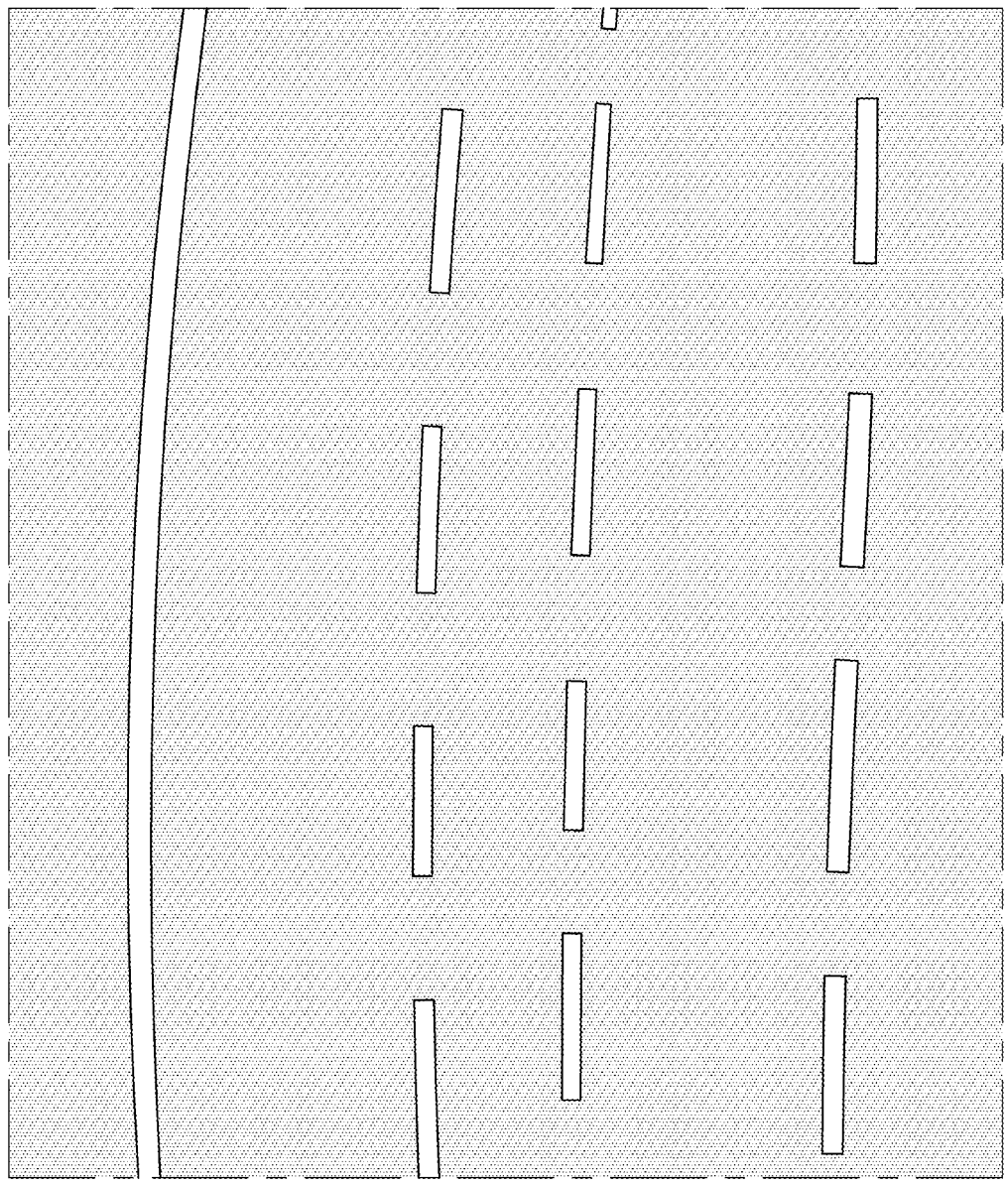
FIG. 5A is a diagram illustrating a result of binarizing a top-view image by a line detection apparatus provided in an image-based line detection system used in an exemplary embodiment of the present disclosure.

Thereafter, the line detection apparatus 300 may binarize a pixel corresponding to a line in the top-view image as white (255) and the remaining pixels as black (0). This binarized image (hereinafter, a binary image) is illustrated in FIG. 5A.

Figure 5B:
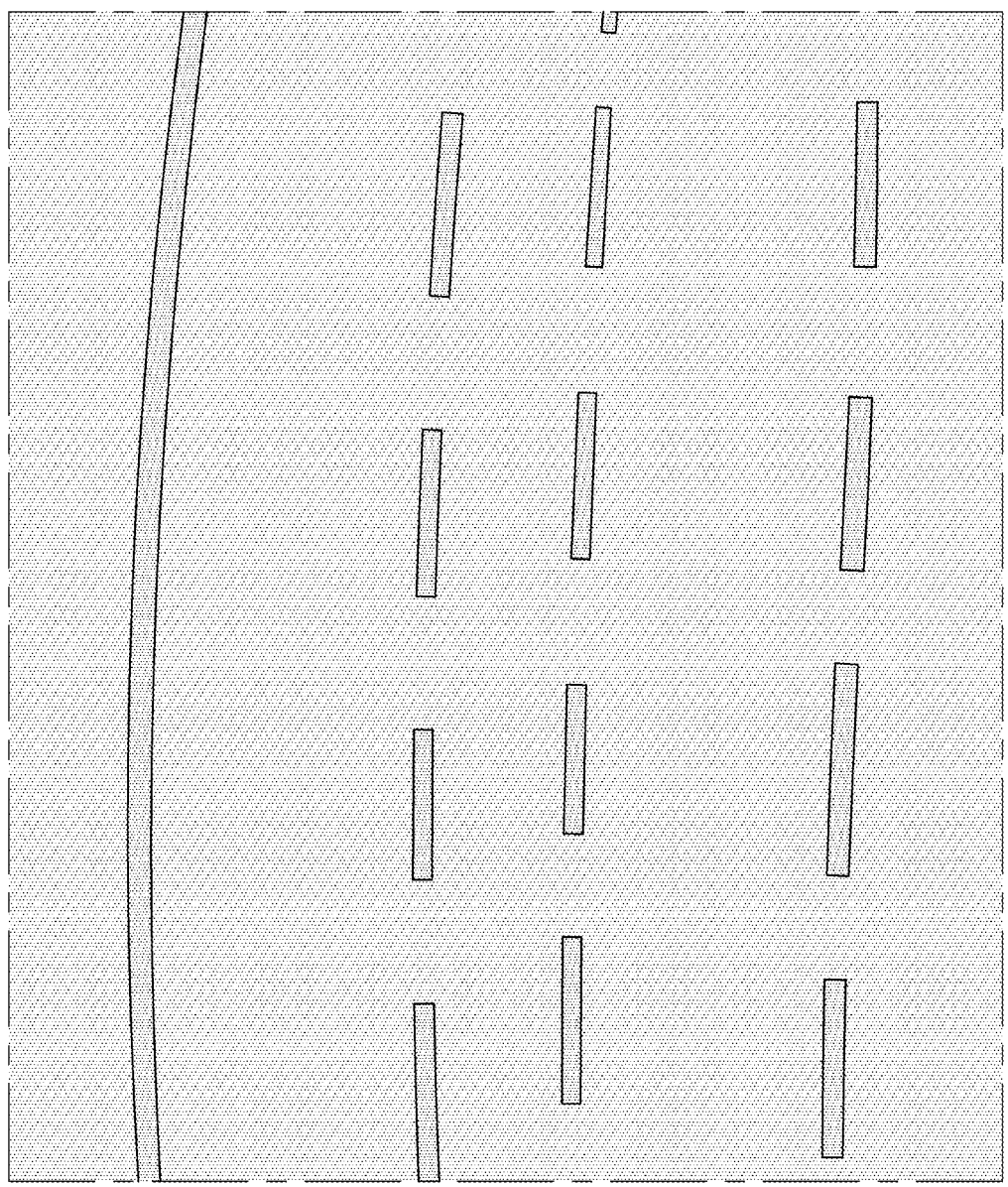
FIG. 5B is a diagram illustrating a result of extracting an edge of a line from a binary image by the line detection apparatus provided in the image-based line detection system used in an exemplary embodiment of the present disclosure.

Thereafter, the line detection apparatus 300 may extract an edge of the line area from the binary image. In this case, a portion at which the pixel value changes from 0 to 255 is referred to as a rising edge, and a portion at which the pixel value changes from 255 to 0 is referred to as a falling edge. The edge of the line area extracted in this way is illustrated in FIG. 5B.

Figure 5C:
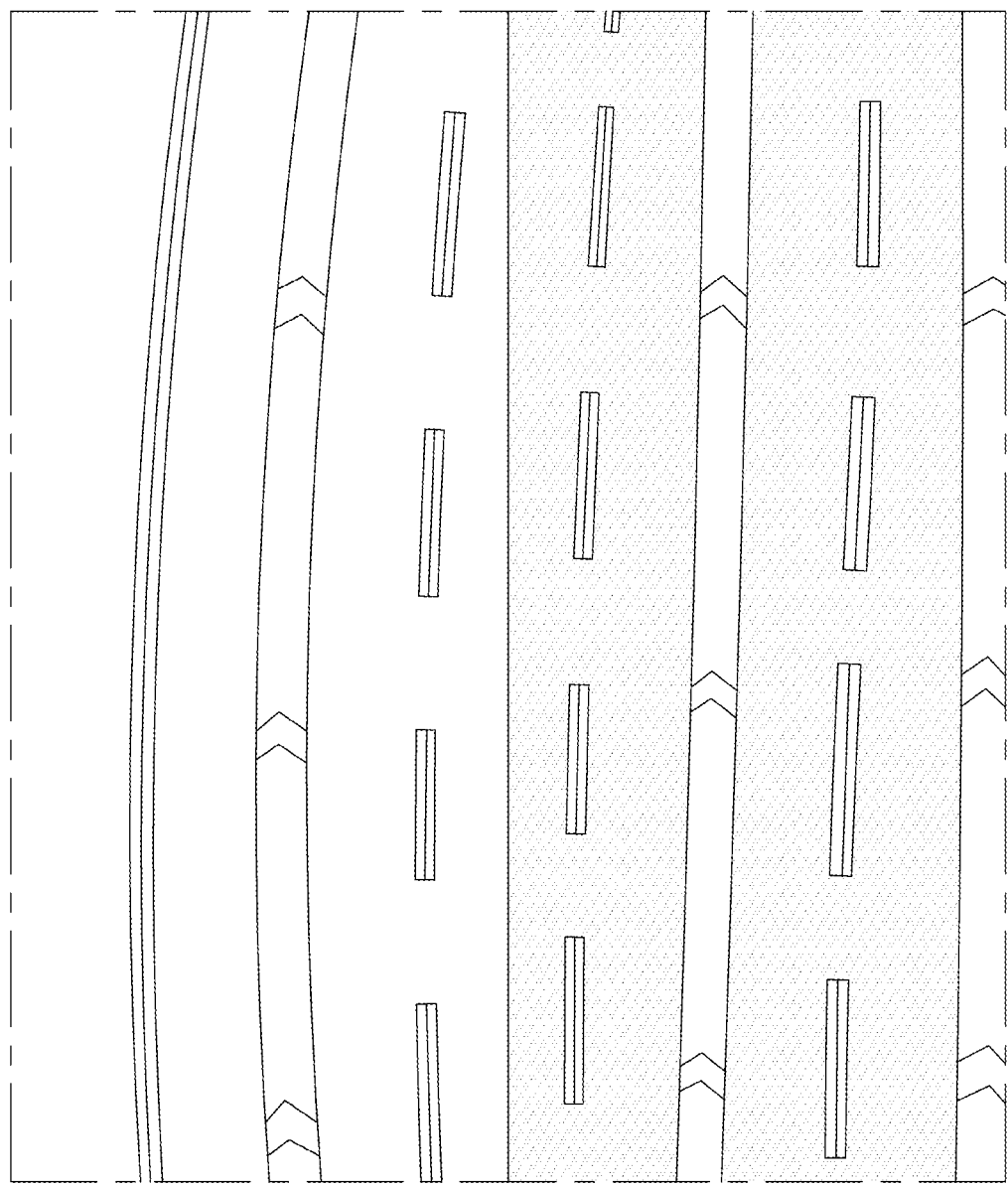
FIG. 5C is a diagram illustrating a result of extracting a center point from a line area by a line detection apparatus provided in an image-based line detection system used in an exemplary embodiment of the present disclosure.

Thereafter, the line detection apparatus 300 may extract points (hereinafter, center points) located in the center of the line area. In this case, the line detection apparatus 300 may regard an area having a width exceeding a reference value in the line area as noise and may exclude it from the line area. The center points extracted in this way are as illustrated in FIG. 5C.

Figure 5D:
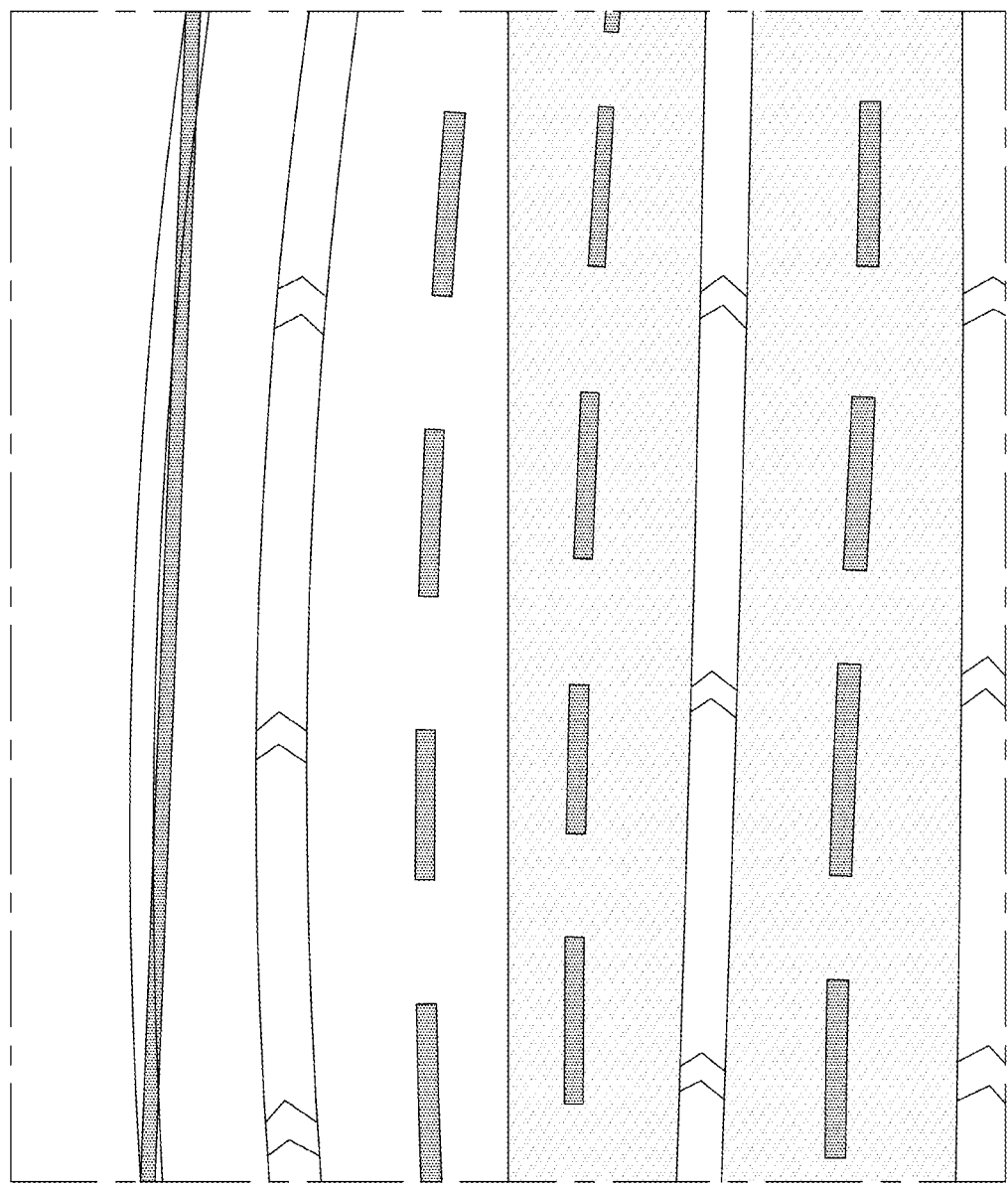
FIG. 5D is a diagram illustrating a result of clustering center points of a line area by a line detection apparatus provided in an image-based line detection system used in an exemplary embodiment of the present disclosure.

Thereafter, the line detection apparatus 300 may cluster adjacent center points. In this case, the line detection apparatus 300 may group points in which the square of a distance between the points is '9' (one pixel is '1') or less. A result of such clustering (hereinafter, cluster) is illustrated in FIG. 5D.

Figure 5E:
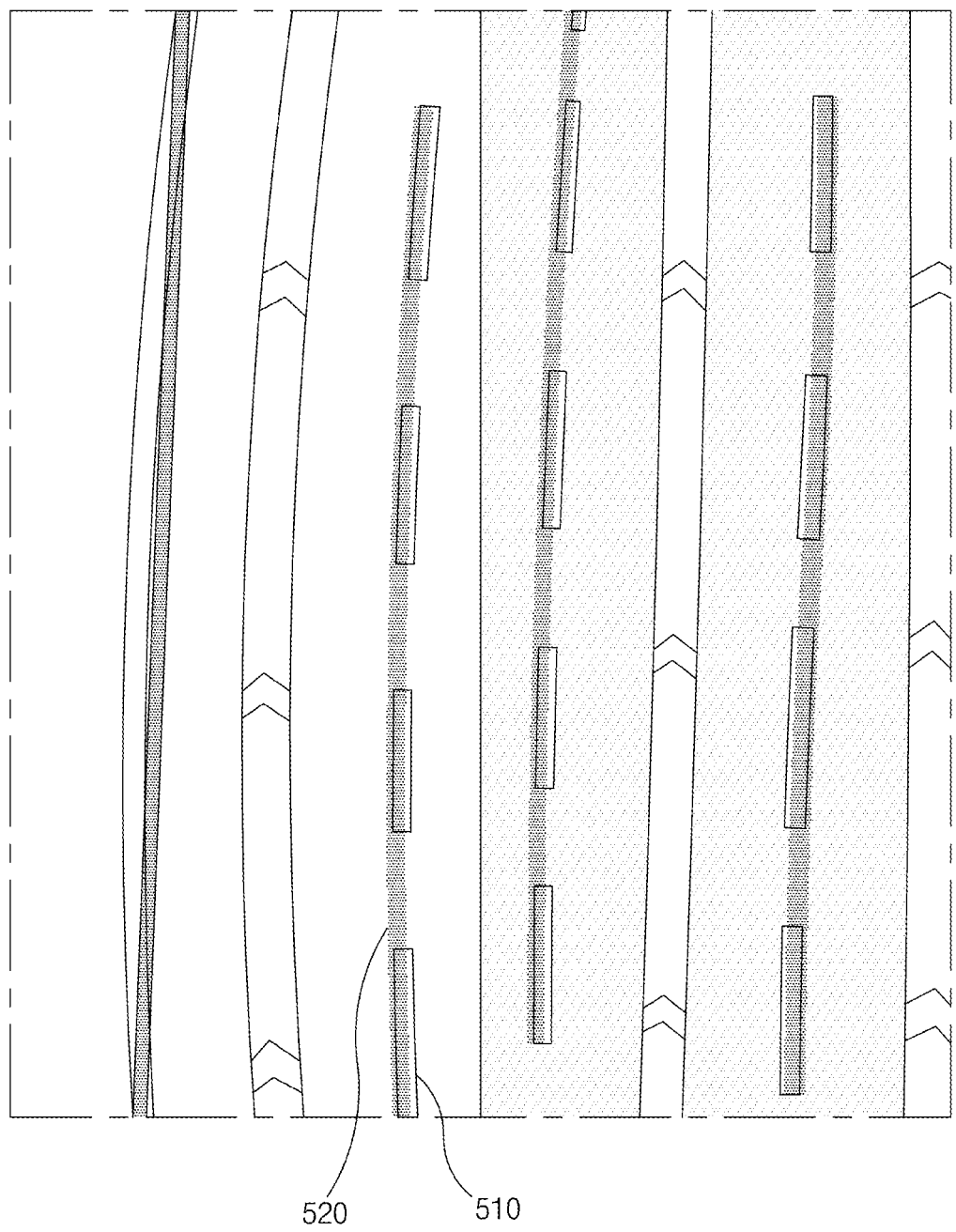
FIG. 5E is a diagram illustrating a result of detecting a line by a line detection apparatus provided in an image-based line detection system used in an exemplary embodiment of the present disclosure.

Thereafter, the line detection apparatus 300 may detect the line by connecting the clusters. In this case, the line detection apparatus 300 may connect the clusters in consideration of the distance and angle between the clusters. For example, when a distance between the first cluster and the second cluster is within a reference distance and an angle between the first cluster and the second cluster is within a reference angle, the line detection apparatus 300 may connect the first cluster to the second cluster. The line detected in this way is as illustrated in FIG. 5E. In FIG. 5E, a reference number 510 indicates an actual line, and a reference number 520 indicates a line detected by the line detection apparatus 300.

The driving control apparatus 400 may improve a driving stability of the vehicle, by detecting a double traffic line with respect to the lines detected for each frame by the line detection apparatus 300, generating a virtual center line between an inside line and an outside line of the double traffic line, and controlling the driving of the vehicle based on the virtual center line.

The driving control apparatus 400 may determine the reliability of the virtual center line by determining whether the virtual center line is located in a center between the inside line and outside line of the double traffic line.

Hereinafter, a detailed configuration of the driving control apparatus 400 will be described with reference to FIG. 6.

Figure 6:
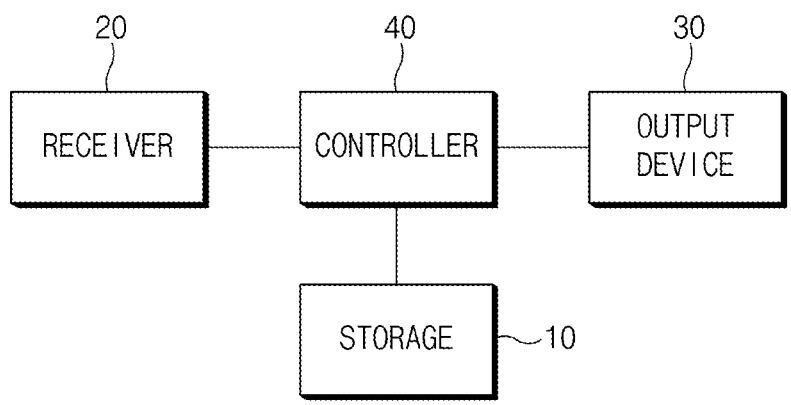
FIG. 6 is a configuration diagram illustrating a driving control apparatus for a vehicle, according to an exemplary embodiment of the present disclosure.

FIG. 6 is a configuration diagram illustrating a driving control apparatus for a vehicle, according to an exemplary embodiment of the present disclosure.

As illustrated in FIG. 6, the driving control apparatus 400 for a vehicle according to an exemplary embodiment of the present disclosure may include storage 10, a receiver 20, an output device 30, and a controller 40. In this case, according to a method of implementing the driving control apparatus 400 for a vehicle according to an exemplary embodiment of the present disclosure, each component may be combined with each other to be implemented as one, or some components may be omitted.

Referring to each of the components, first, the storage 10 may store various logics, algorithms, and programs required in the process of detecting the double traffic line with respect to the lines detected for each frame by the line detection apparatus 300, generating the virtual center line between an inside line and an outside line of the double traffic line, and controlling the driving of the vehicle based on the virtual center line.

The storage 10 may store information on the line detected for each frame by the line detection apparatus 300.

The storage 10 may store information on the virtual center line generated by the controller 40.

The storage 10 may include at least one type of storage medium of a memory such as a flash memory type, a hard disk type, a micro type, and a card type (e.g., an SD card (Secure Digital Card) or an XD card (eXtream Digital Card)), and a memory such as a RAM (Random Access Memory), an SRAM (Static RAM), a ROM (Read-Only Memory), a PROM (Programmable ROM), an EEPROM (Electrically Erasable PROM), an MRAM (magnetic RAM), a magnetic disk, and optical disk type memory.

The receiver 20 may be a module for receiving information on lines detected for each frame from the line detection apparatus 300, but when the line detection apparatus 300 is integrated into the driving control apparatus 400 for the vehicle and implemented, the receiver 20 may not be a necessary component.

The output device 30 may include a display device (not illustrated) that displays a line detected by the line detection apparatus 300 or a virtual center line generated by the driving control apparatus 400 for the vehicle, and a communication device (not illustrated) that transmits information on the line detected by the line detection apparatus 300 or information on the virtual center line generated by the driving control apparatus 400 for the vehicle to the autonomous vehicle.

In this case, the display device may include a cluster provided in the vehicle, and the communication device may include at least one of a mobile communication module, a wireless Internet module, and a short-range communication module.

The mobile communication module may perform communication through a mobile communication network constructed based on technology standards or communication methods (e.g., a GSM (Global System for Mobile communication), a CDMA (Code Division Multi Access), a CDMA2000 (Code Division Multi Access 2000), an EV-DO (Enhanced Voice-Data Optimized or Enhanced Voice-Data Only), a WCDMA (Wideband CDMA), a HSDPA (High Speed Downlink Packet Access), a HSUPA (High Speed Uplink Packet Access), an LTE (Long Term Evolution), an LTE-A (Long Term Evolution-Advanced), or the like) for mobile communication.

The wireless Internet module may be a module for wireless Internet access and may perform communication through a WLAN (Wireless LAN), a Wi-Fi (Wireless-Fidelity), a Wi-Fi (Wireless Fidelity) Direct, a DLNA (Digital Living Network Alliance), a WiBro (Wireless Broadband), a WiMAX (World Interoperability for Microwave Access), a HSDPA (High Speed Downlink Packet Access), a HSUPA (High Speed Uplink Packet Access), an LTE (Long Term Evolution), an LTE-A (Long Term Evolution-Advanced), or the like.

The short-range communication module may support short-range communication using at least one of technologies of a Bluetooth™, an RFID (Radio Frequency Identification), an IrDA (Infrared Data Association), a UWB (Ultra Wideband), a ZigBee, an NFC (Near Field Communication), a Wireless USB (Wireless Universal Serial Bus).

The controller 40 may perform overall control such that each of the components may perform their functions normally. The controller 40 may be implemented in the form of hardware, or may be implemented in the form of software, or may be implemented in the form of a combination of hardware and software. Preferably, the controller 40 may be implemented as a microprocessor, but is not limited thereto.

In particular, the controller 40 may detect a double traffic line with respect to the lines detected for each frame by the line detection apparatus 300, may generate a virtual center line between an inside line and an outside lines of the double traffic line, and may control driving of the vehicle based on the virtual center line.

The controller 40 may recognize the virtual center line as the line of a lane, and may perform path generation control of the vehicle, path driving control of the vehicle, collision prevention with obstacles, and the like as well as acceleration, braking, and steering of the vehicle.

Hereinafter, an operation of the controller 40 will be described in detail with reference to FIGS. 7 to 9.

Figure 7:
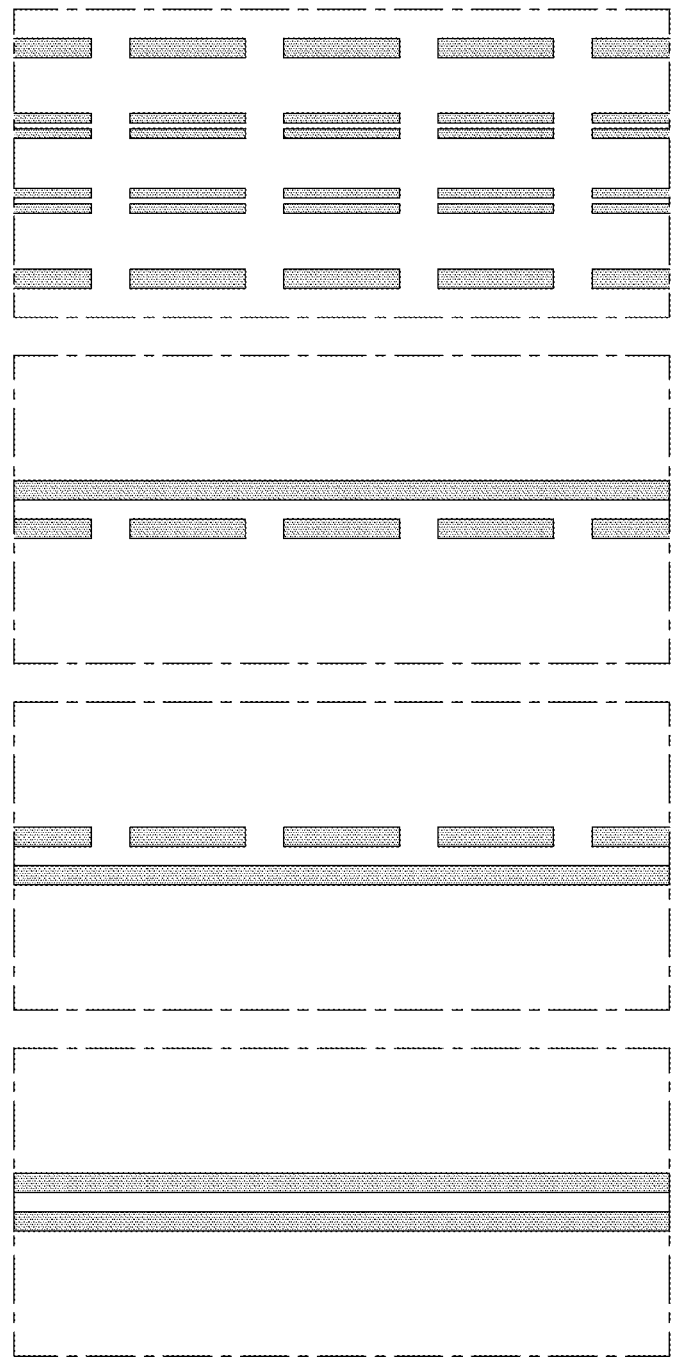
FIG. 7 is a diagram illustrating a double traffic line detected by a controller provided in a driving control apparatus of a vehicle, according to an exemplary embodiment of the present disclosure.

FIG. 7 is a diagram illustrating a double traffic line detected by a controller provided in a driving control apparatus of a vehicle, according to an exemplary embodiment of the present disclosure.

As illustrated in FIG. 7, the controller 40 provided in the driving control apparatus for a vehicle, according to an exemplary embodiment of the present disclosure may detect a double traffic line in which both the inside and outside lines are solid lines, a double traffic line in which the inside line is a solid line and the outside line is a dotted line, a double traffic line in which the inside line is a dotted line and the outside line is a solid line, and a double traffic line in which both the inside and outside lines are dotted lines.

The controller 40 may recognize the first line and the second line as a double traffic line when an angle between the first line and the second line among the lines detected by the line detection apparatus 300 does not exceed a reference angle (e.g., 0.5°), and a distance between the first line and the second line does not exceed a reference distance (e.g., 40 cm). In this case, when the first line is referred to as an inside line, the second line is referred to as an outside line, and when the first line is referred to as an outside line, the second line is referred to as an inside line.

Figure 8:
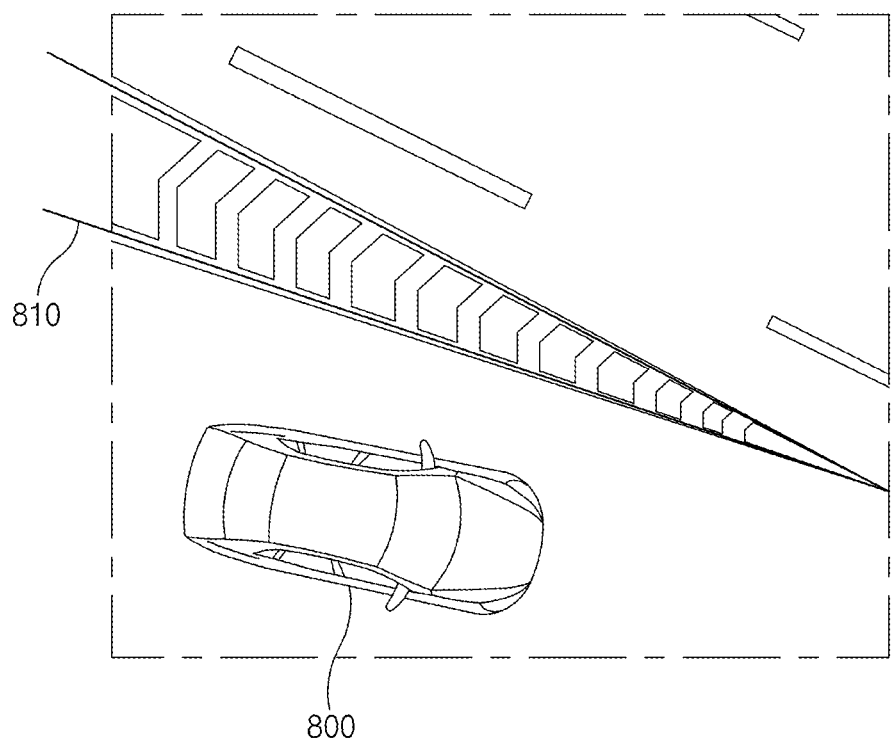
FIG. 8 is a diagram illustrating a zebra line detected by a controller provided in a driving control apparatus of a vehicle, according to an exemplary embodiment of the present disclosure.

The reason why the reference angle is considered as a condition for recognizing the double traffic line is to prevent the controller 40 from recognizing a zebra line as the double traffic line as illustrated in FIG. 8.

Meanwhile, when a double traffic line is recognized, the controller 40 may allow the line detection apparatus 300 to change the angle, which is a condition for connecting the first cluster and the second cluster, from a default angle (25°) to a reference angle (5°) so as to generate a line. When the angle is narrowed in this way, it is possible to prevent the double traffic line from being recognized as a single line.

For example, when the clusters forming the inside line of a double traffic line are ①,②, and ③ and the clusters forming the outside line are ④,⑤, and ⑥, the clusters ①,⑤, and ③ may be grouped into one line at the default angle. Accordingly, the controller 40 may prevent the double traffic line from being recognized as a single line by narrowing the angle, which is a condition for connecting the clusters, so as to increase the accuracy of double traffic line recognition.

FIG. 8 is a diagram illustrating a zebra line detected by a controller provided in a driving control apparatus of a vehicle, according to an exemplary embodiment of the present disclosure.

As illustrated in FIG. 8, when the controller 40 detects the zebra line, an inside line 810 may be recognized as the left line of a vehicle 800.

Figure 9:
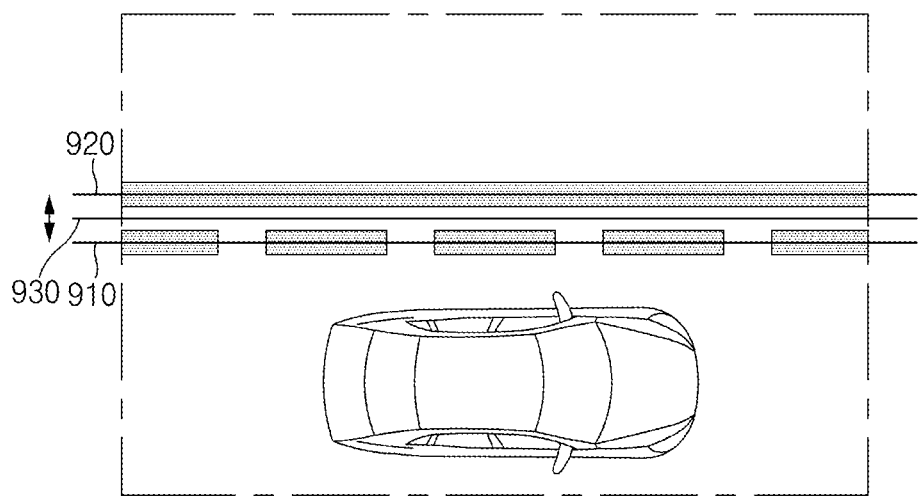
FIG. 9 is a diagram illustrating a process in which a controller provided in a driving control apparatus of a vehicle according to an exemplary embodiment of the present disclosure generates a virtual center line.

FIG. 9 is a diagram illustrating a process in which a controller provided in a driving control apparatus of a vehicle according to an exemplary embodiment of the present disclosure generates a virtual center line.

In FIG. 9, a reference number 910 indicates an inside line of a double traffic line, a reference number 920 indicates an outside line of a double traffic line, and a reference number 930 indicates a virtual center line.

The controller 40 may represent the inside line 910 as a quadratic function by fitting points constituting the inside line 910 and may represent the outside line 920 as a quadratic function by fitting points constituting the outside line 920. In addition, the controller 40 may obtain a coefficient of the quadratic function representing the inside line 910 and may obtain a coefficient of the quadratic function representing the outside line 920.

Thereafter, the controller 40 may obtain an average value of the coefficient of the quadratic function representing the inside line 910 and the coefficient of the quadratic function representing the outside line 920 and may generate the virtual center line 930 based on the average value. In this case, generating the virtual center line 930 means generating a quadratic function of the virtual center line 930.

Thereafter, the controller 40 may control the driving of the vehicle by recognizing the virtual center line 930 as a line. In FIG. 9, the controller 40 may recognize the virtual center line 930 as a left line of the vehicle.

Meanwhile, the controller 40 may calculate the reliability of the virtual center line 930 based on the degree to which the virtual center line 930 is located in a center between the inside line 910 and the outside line 920 of the double traffic line. That is, the controller 40 may count an effective number of times that an intermediate value between a value y1 on the quadratic function of the inside line 910 for an 'x' value and a value y2 on the quadratic function of the outside line 920 for the 'x' value is located on a quadratic function representing the virtual center line 930 and may calculate a ratio of the effective number of times to a total number of times as the reliability of the virtual center line 930.

Figure 10:
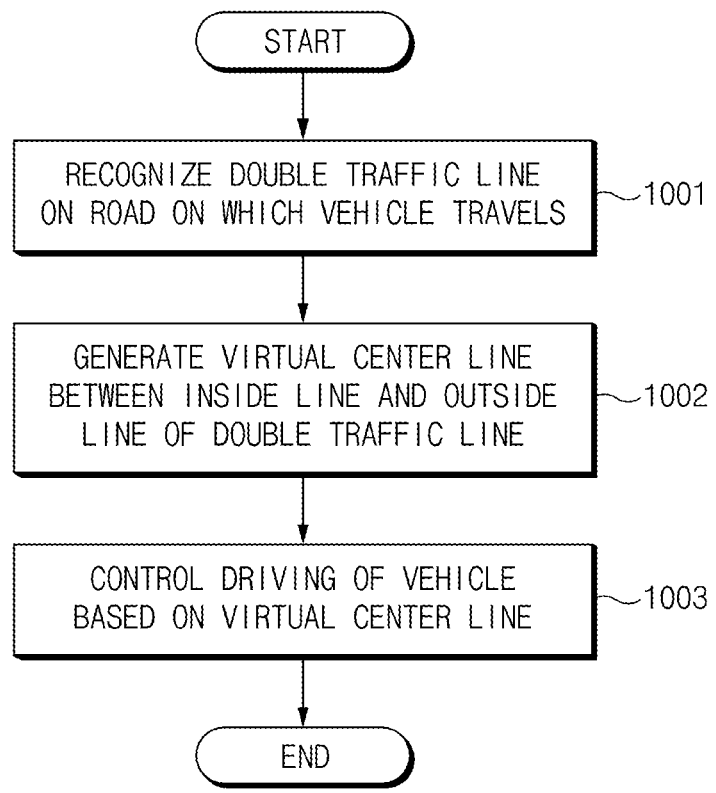
FIG. 10 is a flowchart illustrating a driving control method for a vehicle, according to an exemplary embodiment of the present disclosure.

FIG. 10 is a flowchart illustrating a driving control method for a vehicle, according to an exemplary embodiment of the present disclosure.

First, the controller 40 may recognize a double traffic line on a road on which a vehicle travels (1001). In this case, the controller 40 may recognize a double traffic line from the lines detected by the line detection apparatus 300. Meanwhile, when a double traffic line is recognized, the controller 40 may allow the line detection apparatus 300 to change the angle, which is a condition for connecting the first cluster and the second cluster, from a default angle (25°) to a reference angle (5°) so as to generate a line. In addition, when the driving control apparatus 400 performs the function of the line detection apparatus 300, the controller 40 may directly change the angle, which is a condition for connecting the first cluster and the second cluster, from the default angle (25°) to the reference angle (5°) so as to generate the line.

Thereafter, the controller 40 may generate a virtual center line between the inside line and the outside line of the double traffic line (1002).

Thereafter, the controller 40 may control the driving of the vehicle based on the virtual center line (1003).

Figure 11:
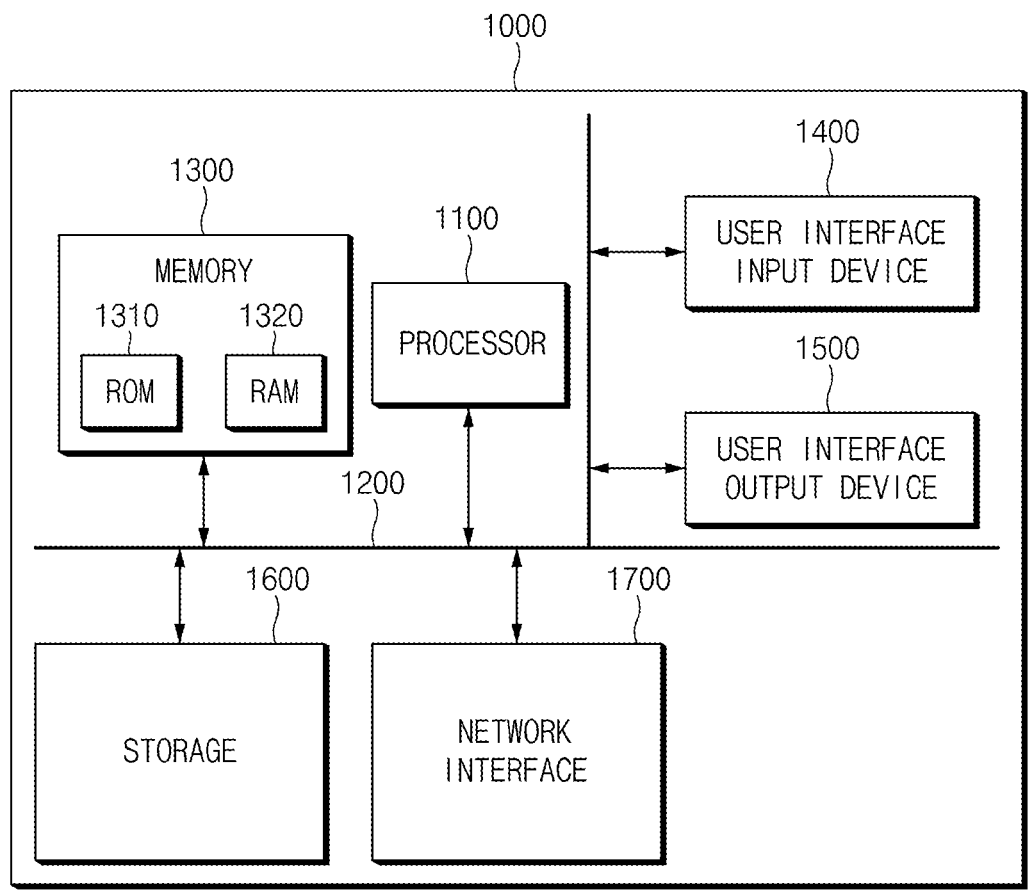
FIG. 11 is a block diagram illustrating a computing system for executing a driving control method of a vehicle, according to an exemplary embodiment of the present disclosure.

FIG. 11 is a block diagram illustrating a computing system for executing a driving control method of a vehicle, according to an exemplary embodiment of the present disclosure.

Referring to FIG. 11, a driving control method of a vehicle according to an exemplary embodiment of the present disclosure may be implemented through a computing system. A computing system 1000 may include at least one processor 1100, a memory 1300, a user interface input device 1400, a user interface output device 1500, storage 1600, and a network interface 1700, which are connected with each other through a system bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The storage medium as an example may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

According to an exemplary embodiment of the present disclosure, a driving control apparatus and method for a vehicle may improve a driving stability of the vehicle, by detecting a double traffic line on a driving road based on a top-view image, generating a virtual center line between an inside line and an outside line of the double traffic line, and controlling driving of the vehicle based on the virtual center line.

The above description is merely illustrative of the technical idea of the present disclosure, and those of ordinary skill in the art to which the present disclosure pertains will be able to make various modifications and variations without departing from the essential characteristics of the present disclosure.

Therefore, embodiments of the present disclosure are not intended to limit the technical spirit of the present disclosure but provided only for the illustrative purpose. The scope of protection of the present disclosure should be construed by the attached claims, and all equivalents thereof should be construed as being included within the scope of the present disclosure.

What is claimed is:

1. A driving control apparatus for a vehicle, the apparatus comprising:
    a controller configured to:
        recognize a double traffic line on a road on which the vehicle travels,
        generate a virtual center line between an inside line and an outside line of the double traffic line, and
        control driving of the vehicle based on the virtual center line; and
    a display device configured to display the virtual center line;
    wherein the controller is further configured to calculate a reliability of the virtual center line based on a degree to which the virtual center line is located at a center between the inside line and the outside line.

2. The apparatus of claim 1, wherein the controller is further configured to recognize that the inside line and the outside line are the double traffic line when an angle between the inside line and the outside line does not exceed a reference angle, and a distance between the inside line and the outside line does not exceed a reference distance.

3. The apparatus of claim 2, wherein the reference angle is set to an angle for filtering a zebra line, which is a set of parallel lines arranged as in a crosswalk.

4. The apparatus of claim 1, wherein the controller is further configured to recognize any one of a double traffic line in which both the inside line and the outside line are solid lines, a double traffic line in which the inside line is a solid line and the outside line is a dotted line, a double traffic line in which the inside line is a dotted line and the outside line is a solid line, and a double traffic line in which both the inside lid outside line are dotted lines.

5. The apparatus of claim 1, wherein the controller is further configured to represent the inside line as a quadratic function 'A', represents the outside line as a quadratic function 'B', obtains an average value of coefficients of each of the quadratic functions 'A' and 'B', and generates the virtual center line based on the average value.

6. The apparatus of claim 5, wherein the controller is further configured to count an effective number of times that an intermediate value between a value y1 on the quadratic function 'A' for an 'x' value and a value y2 on the quadratic function 'B' for the 'x' value is located on a quadratic function representing the virtual center line and calculates a ratio of the effective number of times to a total number of times as a reliability of the virtual center line.

7. A driving control method for a vehicle, the method comprising:
    recognizing, by a controller, a double traffic line on a road on which the vehicle travels;
    generating, by the controller, a virtual center line between an inside line and an outside line of the double traffic line;
    controlling, by the controller, driving of the vehicle based on the virtual center line;
    wherein the generating of the virtual center line comprises:
        representing the inside line as a quadratic function 'A';
        representing the outside line as a quadratic function 'B';
        obtaining an average value of coefficients of each of the quadratic functions 'A' and 'B'; and
        generating the virtual center line based on the average value; and
    calculating a reliability of the virtual center line based on a degree to which the virtual center line is located at a center between the inside line and the outside line.

8. The method of claim 7, wherein the recognizing of the double traffic line on the road comprises recognizing that the inside line and the outside line are the double traffic line when an angle between the inside line and the outside line does not exceed a reference angle, and a distance between the inside line and the outside line does not exceed a reference distance.

9. The method of claim 8, wherein the reference angle is set to an angle for filtering a zebra line, which is a set of parallel lines arranged as in a crosswalk.

10. The method of claim 8, wherein the double traffic line recognizes any one of a double traffic line in which both the inside line and the outside line are solid lines, a double traffic line in which the inside line is a solid line and the outside line is a dotted line, a double traffic line in which the inside line is a dotted line and the outside line is a solid line, and a double traffic line in which both the inside line and the outside line are dotted lines.

11. The method of claim 7, wherein the calculating of the reliability of the virtual center line comprises:
    counting an effective number of times that an intermediate value between a value y1 on the quadratic function 'A' for an 'x' value and a value y2 on the quadratic function 'B' for the 'x' value is located on a quadratic function representing the virtual center line; and calculating a ratio of the effective number of times to a total number of times as the reliability of the virtual center line.

* * * * *